United States Patent [19]

Drake et al.

[11] Patent Number: 4,663,366

[45] Date of Patent: May 5, 1987

[54] SHEAR THICKENING COMPOSITION WITH POLYCARBOXYLIC ACID

[75] Inventors: Evelyn N. Drake, Plainfield; Peter Calcavecchio, Lodi, both of N.J.

[73] Assignee: Exxon Research & Engineering Company, Florham Park, N.J.

[21] Appl. No.: 586,840

[22] Filed: Mar. 6, 1984

Related U.S. Application Data

[63] Continuation-in-part of Ser. No. 516,767, Jul. 25, 1983, abandoned, which is a continuation-in-part of Ser. No. 413,460, Aug. 31, 1982, abandoned.

[51] Int. Cl.$^4$ ............................................. C09K 7/00
[52] U.S. Cl. ................................... 523/130; 166/294; 166/295; 252/8.55 T
[58] Field of Search ........... 252/8.5 LC, 8.5 C, 8.5 P, 252/8.55 R; 166/294, 295; 523/130, 206, 207, 200; 524/500, 521, 501, 522, 514

[56] References Cited

U.S. PATENT DOCUMENTS

| | | | |
|---|---|---|---|
| 3,448,800 | 6/1969 | Parker et al. | 166/294 |
| 4,128,528 | 12/1978 | Frisque et al. | 252/8.5 A |
| 4,173,999 | 11/1979 | Messenger | 252/8.5 LC |
| 4,391,925 | 7/1983 | Mintz et al. | 252/8.5 C |
| 4,397,354 | 8/1983 | Dawson et al. | 166/294 |

Primary Examiner—Josephine L. Barr
Attorney, Agent, or Firm—Richard E. Nanfeldt

[57] ABSTRACT

A shear thickening composition which comprises a water-in-oil emulsion having dispersed in the continuous, oily phase thereof, hydratable, water-expandable hydrophillic clay, wherein said oily phase has a polyamine derivative surfactant dissolved therein and the dispersed aqueous phase comprises an aqueous solution of a polyacrylamide and polycarboxylic acid. These compositions are useful as well control fluids and may be used in deep wells.

25 Claims, 1 Drawing Figure

Effect of Polyacrylic Acid on Low Shear Thickening Time of Well Control Fluid

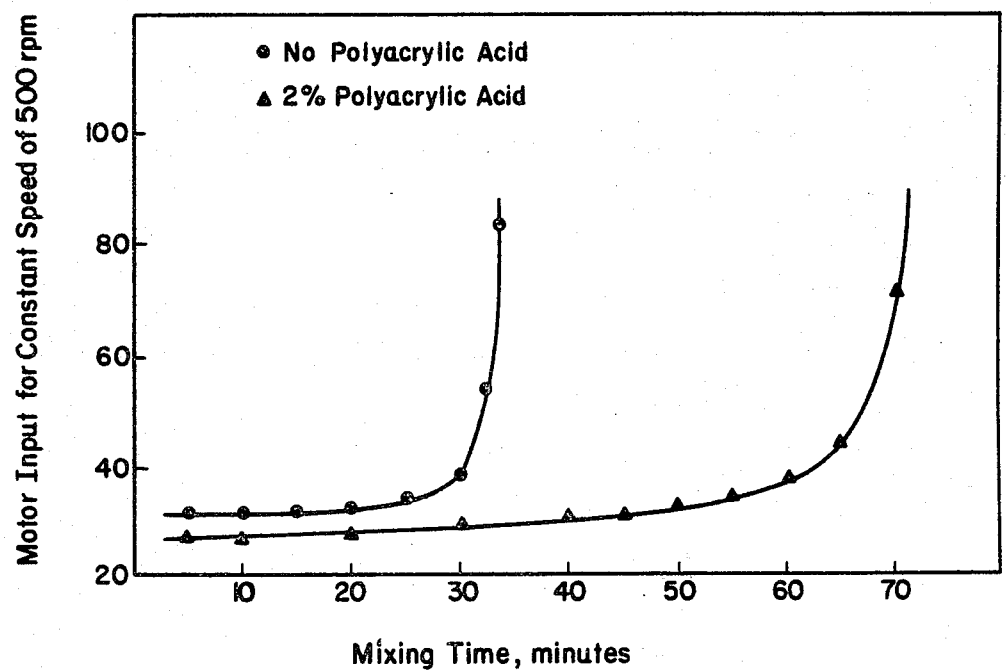

4,663,366

SHEAR THICKENING COMPOSITION WITH POLYCARBOXYLIC ACID

BACKGROUND OF THE INVENTION

1. Field of the Invention

This invention relates to a shear thickening composition of matter useful as a well control fluid. More particularly, this invention relates to a shear thickening composition comprising a water-in-oil emulsion having hydrophillic, water-expandable clay dispersed in the continuous, oily phase thereof, said oily phase having a polyamine derivative surfactant dissolved therein and said dispersed aqueous phase having a polyacrylamide polymer and a polycarboxylic acid dissolved therein.

2. Background of the Disclosure

During the drilling and production of wells, such as oil, gas or water wells, various problems sometimes occur which, if not corrected, result in the loss of considerable well production and even loss of the well itself. These problems include blow-outs, lost circulation and channeling. Surface blow-outs occur when the drill bit cuts into a high pressure zone of gas, oil, or water which can blow out the drilling mud and sometimes even the drill stem, bit and surface equipment resulting in their loss and destruction also. Underground blow-outs occur when a fluid in one porous formation flows into the well bore and then out of the well bore into another porous formation. Lost circulation of drilling mud occurs when the drill bit cuts through a porous formation at a pressure such that drilling mud coming down the drill stem flows into the porous structure instead of being forced back up to the surface between the drill stem and well casing. Channeling occurs when a fluid in one porous formation flows through continuous passages in cement behind well casing into another porous formation at a different depth in the well.

A number of methods and compositions have been employed in order to solve these problems, none of which has met with complete success and, in fact, most have not been too successful. One method of trying to stop blow-outs involves loading up the well with a slurry of barite under pressure and under conditions such that the barite is able to settle uniformly at the bottom of the well to form a hard plug which may then be followed up with a cement slurry in order to make the plug more or less permanent. Various methods employed to stop lost circulation include slurries of barite along with fibrous, lumpy or flakey materials which it is hoped will ultimately form a filter cake and then a mat over the porous formation and thus plug it up. Another method used is to employ what is known as gunk which is a slurry of dry, powdered bentonite in diesel oil. When this material is mixed with the right amount of water, the bentonite will hydrate yielding a stiff paste. If formed at the right time and at the right place, this sometimes works as an effective lost circulation and well-plugging material. This type of material and method for its use is disclosed, for example, in U.S. Pat. No. 3,082,823. However, there are many problems associated with the use of this gunk. Among these problems is that the slurry must be kept dry until it reaches the desired formation in the well bore at which time it must be mixed with the proper amount of water in order to form a paste and not an emulsion or a slurry of hydrated benetonite.

U.S. Pat. No. 3,448,800 discloses a plugging method for restoring lost circulation in a well wherein a suspension or slurry of a particulate, water-soluble polymer in a non-aqueous medium is injected into a well. An aqueous slurry of a mineral material such as cement, barite or plaster of paris is separately injected into the well, with the two slurries meeting and mixing at the bottom of the well bore to form a plug at the area of lost circulation. U.S. Pat. No. 2,836,555 discloses a well plugging composition for restoring lost circulation in wells which comprises compressed, dehydrated pellets of bentonite encapsulated within a solid, water-insoluble polymeric coating which has a tiny hole drilled through the surface thereof. These pellets are pumped down into the well bore and, as they do so, water seeps into the hole in the coating into the bentonite thereby swelling and ultimately rupturing the coating. By proper design of the coating, etc., it is postulated that the pellets will rupture after they have become lodged in the lost circulation area to form a tight seal. U.S. Pat. No. 2,890,169 discloses another well control or lost circulation fluid which is made by forming a slurry of an organophilic bentonite and cement in oil. This slurry is mixed with a surfactant and water to form a composition comprising a water-in-oil emulsion having organophilic bentonite and cement dispersed in the continuous oil phase. As this composition is pumped down the well bore, the oil expands and flocculates the bentonite which, under the right conditions, forms a filter cake on the well bore surface in the porous area. This is then supposed to cause a filtration action which breaks the emulsion causing the emulsified water to react with the cement to form a solid coating on the filter cake thereby plugging the porous area.

One of the problems encountered with the use of organophilic clays, such as bentonite clays treated with quaternary ammonium compounds having at least one alkyl, alkylene or alkylidine radical, is that oil rapidly expands and disperses the clay at low shear rates. These organic modified clays are prepared from bentonite-type clays that are normally hydrophillic in nature before modification. A typical organic modified clay is dimethyldihydrogenated tallow ammonium bentonite. They clays are used mainly as oil viscosifiers and dispersion aids and are not used as the plugging component of well control fluids.

It is known to those in the art that if one can mix a hydrophilic or water expandable clay, such as bentonite, with the proper amount of water in the presence of a water-soluble polymer which will flocculate and congeal the clay, a much stronger and stiffer paste can be made than that which will occur if the bentonite is merely mixed with water. Thus, U.S. Pat. No. 3,909,421 discloses a high viscosity fluid useful in secondary oil recovery processes. This fluid is made by physically blending a dry, powdered polyacrylamide with bentonite followed by mixing the powder blend with water. U.S. Pat. No. 4,128,598 claims a powdered bentonite-polyacrylamide thickening composition prepared by mixing a water-in-oil emulsion with bentonite to form a damp, free-flowing powdered composition which rapidly forms a viscous, stiff material when mixed with water. The dispersed aqueous phase of the emulsion contains a water soluble surfactant along with a dispersion and/or solution of a water soluble polymer formed in-situ in the emulsion. The water-soluble polymer may be polyacrylamide or a copolymer of acrylamide and acrylic or methacrylic acid. This composition is taught as being useful for drilling muds, bases for earthen dams and clay cements.

Although many efforts have been made in an attempt to use bentonite-water systems with or without a water-soluble polymer which will flocculate and congeal the bentonite, one of the main problems has been to keep the bentonite away from the water until same reaches the desired part of the well bore, which is usually at the bottom. Another problem has been making sure that the bentonite mixes with the proper amount of water to rapidly form a stiff paste or cement at the location of the problem in the well.

An attempt to overcome these difficulties has been made by dispersing bentonite into the continuous, oily phase of a water-in-oil emulsion formulated to have a proper balance of water and bentonite and also formulated to keep the bentonite and water apart until the dispersion is forced through the nozzles of the drill bit at the bottom of the well. Thus, copending application Ser. No. 79,436 filed on Sept. 27, 1979, now abandoned and U.S. Pat. Nos. 4,397,354 and 4,391,925 disclose shear thickening well control fluids which comprise bentonite dispersed in the continuous, oily phase of a water-in-oil emulsion. The oily phase contains a surfactant and the dispersed, aqueous phase may or may not contain a water-soluble polymer, such as a polyacrylamide, for congealing and flocculating the clay. These well control fluids have met with some success in solving some of the problems discussed above. However they cannot be used in deep wells, i.e., about 10,000 feet or more in depth, because as the emulsion is pumped down through the drill stem or drill pipe the clay particles slowly hydrate and break up causing the viscosity of the shear thickening composition to increase to a point requiring excessive pressure to pump same down the drill pipe. In some cases this viscosity increase will be sufficient to cause paste formation to occur in the drill pipe thereby plugging same. Ideally, these materials are pumped down the drill stem wherein the shear forces are relatively low and only when they are pumped out the holes of the drill bit will be relatively high shear forces developed by forcing the material through these relatively narrow openings break the emulsion and cause the water, polymer and bentonite to mix forming a relatively stiff paste substantially instantaneously. However, there is still a need for better well control fluids and particularly for well control fluids capable of being used in deep wells of 10,000 feet or more.

SUMMARY OF THE INVENTION

The present invention relates to a shear thickening composition comprising a water-in-oil emulsion having particles of hydrophilic, water swellable clay dispersed in the continuous, oily phase thereof, wherein said continuous oily phase comprises a hydrocarbon liquid having a polyamine derivative surfactant dissolved therein and the dispersed aqueous phase of the emulsion comprises an aqueous solution of a polyacrylamide polymer and a polycarboxylic acid. The combination of polyamine derivative surfactant in the oil phase and polyacrylamide polymer and polycarboxylic acid in the dispersed aqueous phase results in an unexpected formation of a coating or membrane film around each droplet of dispersed aqueous phase. However, the coating or membrane will not form if the pH of the aqueous phase is not acid or below 7. Hence, another feature of this invention is that the pH of the dispersed aqueous phase be below 7.

This shear thickening composition is useful as a well control fluid, for forming earthen dams, for lining the bottom and sides of waste disposal sites against seapage, as a clay cement, etc. Preferably the surfactant will comprise an alkylene polyamine derivative surfactant and the clay will comprise bentonite. These compositions may be employed as well control fluids in wells having depths in excess of about 8,000 feet as well as in shallower wells.

BRIEF DESCRIPTION OF THE DRAWING

The attached FIGURE is a graph illustrating how the presence of a polyacrylic acid in the aqueous phase increases the low shear thickening time of the shear thickening composition of this invention.

DETAILED DESCRIPTION

A unique feature of the composition of this invention is that each droplet or microdroplet of dispersed aqueous phase is coated with a membrane, coating or film of a polymeric material which forms as a consequence of the aqueous phase being dispersed or emulsified in the oily phase of the emulsion and this film formation occurs irrespective of whether or not the clay is present in the oily phase. The terms film, coating and membrane are used synonymously in the context of this invention.

As set forth above, this film or membrane forms as a result of the interfacial interaction between the polyamine derivative surfactant in the oil phase and the polyacrylamide and polycarboxylic acid in the dispersed aqueous phase. Thus, these three components are required for the film formation. This film formation occurs immediately when the aqueous phase is dispersed in the oily phase to form the emulsion. That is, the formation and presence of the film or membrane occurs as an inherent consequence of the formation of the emulsion itself (or the shear thickening composition if the oily phase contains clay) and not from the introduction of any other material to the emulsion or composition.

The film or coating which surrounds and/or encapsulates each droplet of dispersed aqueous phase is readily discernable when viewed under an optical microscope. Under a magnification of, i.e., $100\times$, the film has the appearance of a plastic balloon, bag or bubble encapsulating each droplet of aqueous phase. Some of these "plastic bags", or films or membranes can be seen to be somewhat wrinkled on portions of the surface thereof. These films also possess physical strength and integrity. By way of illustration, if one inserts a fine needle into the emulsion and touches an encapsulated droplet with the needle, when viewed under $100\times$ the film or "plastic bag" will be seen to deform under the pressure of the needle, but not break or rupture. On continued pushing of the needle, the needle will ultimately penetrate through the coating, membrane or "bag" into the encapsulated aqueous phase.

One can easily demonstrate both the physical integrity and existence of the film as well as the fact that its formation is an interfacial phenomenon by slowly decanting or pouring the polyamine derivative surfactant containing oily phase on top of the polyacrylamide and polycarboxylic acid containing aqueous phase to form two layers. When this is done the film immediately forms at the interface. If one inserts a spatula into or under the so-formed film and slowly pulls it up through the oily phase, the film will adhere to the spatula and be pulled up with it. As the film is slowly pulled up from the oil-water interface, more film continuously forms at the interface until one of the three essential film-forming components is depleted.

It should be noted and appreciated that the emulsion and composition of this invention is not stable indefinitely and should be used within six (6) months after formation, because the membrane coating or film around or encapsulating each droplet of dispersed aqueous phase slowly dissolves and disappears as time progresses. As this film disappears or dissolves into the emulsion, the low shear thickening time enhancement declines. Agitation and elevated temperature both accelerate this aging process. By way of example, a sample of an emulsion of this invention employing a polyacrylic acid as the polycarboxylic acid in the aqueous phase was rolled in an 8 oz. jar for 5 days at 120° F. Examination of the emulsion in a microscope at the end of the 5 days revealed no more polymeric film remaining on the surface of the dispersed microdroplets of aqueous phase. A shear thickening composition subsequently made by dispersing bentonite clay into the oily phase exhibited no low shear thickening time enhancement.

Another unique feature of the emulsion of this invention is that, under fixed mixing conditions, the size of the microdroplets of dispersed aqueous phase are larger (i.e., 10-500 microns) than those of similar emulsions without a polycarboxylic acid in the aqueous phase (10-100 microns). Emulsion of this invention employing a polyacrylic acid in the aqueous phase have been made with dispersed droplets as big as 5,000 microns and work satisfactorily in the shear thickening composition of this invention. It is preferred that the average droplet size of the dispersed aqueous phase be greater than 100 microns. Laboratory tests have shown that the larger the droplet size of the dispersed aqueous phase, the greater will be the strength of the paste. This is in marked contrast to the same type of shear thickening composition, but without containing a polycarboxylic acid in the aqueous phase where the smaller droplet sizes are preferred.

As set forth above, it is important that the dispersed aqueous phase be an acid solution. That is, the pH of the dispersed aqueous phase must be below 7 or the interfacial film will not form. The exact pH range under which the film will form at the oil-water interface depends, among other things, on the nature and molecular weight of the polycarboxylic acid used. By way of illustrative, but non-limiting examples, emulsions were made employing the polyacrylamide and surfactant listed in Example 1. With a polyacrylic acid in the aqueous phase, interfacial film formation occurred within a pH range of from about 2.5 to 4.5. With a polymethacrylic acid, film formation occurred within a pH range of from about 2.9 to 5.8.

If desired or necessary, the pH of the aqueous phase may be adjusted by the addition of an acid such as a mineral acid or a base. However, it should be noted that the interfacial film formation is salt sensitive, inasmuch as film formation will not occur if the aqueous phase contains appreciable amounts of a salt. Thus, at a salt content of 4% NaCl in the aqueous phase no film formed using a polymethacrylic acid whereas only 0.5% NaCl prevented film formation using a polyacrylic acid.

By shear thickening composition is meant that the application of sufficient shear to the composition of this invention will result in the formation of a sticky, rubber-like paste or solid, whose strength and integrity is a function of the intensity and duration of the shear forces employed as well as the particular formulation utilized. The greater the shear rate the faster the paste is formed and the stronger it will be. When the clay is mixed or dispersed into the emulsion it slowly starts to adsorb water. Thus, if one mixes or disperses the clay into the emulsion very gently, using relatively low shear forces and then allows the so-formed composition of this invention to remain undisturbed, the clay will settle out on the bottom and slowly start to adsorb water and ultimately congeal. If sufficient time has elapsed and the settled clay starts to congeal, the shear force required to redisperse the clay will rapidly form a paste. Thus, it is preferred to use the composition of this invention as soon as possible after preparing same.

One can thus understand that the term "shear thickening" is a term of art and is difficult to quantify with precision. If one intends to use the composition of this invention as a well control fluid one may use low shear devices such as those normally used for mixing cement at a well site (i.e., for cementing behind well casing) to form the composition of this invention. Illustrative, but non-limiting examples of such devices include Halliburton ribbon or turbine blenders and cement mixers. After the shear thickening composition has been formed, it will be pumped down the drill pipe at a rate broadly ranging from about 0.1 to 10 barrels per minute (bpm) wherein it will be subject to relatively low shear rates broadly ranging from less than about 1 to about 1,000 sec.$^{-1}$. Even under these conditions the viscosity of the composition slowly rises as the clay absorbs water and slowly hydrates. However, although some prehydration is desirable if one uses shear thickening compositions that do not contain polycarboxylic acid, because, all other things being equal, it will result in a stronger paste formed by the subsequent high shear rates resulting from forcing the shear thickening composition through the holes in the drill bit, it has unexpectedly been found that this prehydration or low shear thickening time is not necessary to form strong pastes using the polycarboxylic acid containing composition of this invention.

With the emulsion/clay dispersions of the prior art, it has been difficult to pump anything more than about 8,000-10,000 feet down the drill pipe without the composition starting to congeal and prematurely gelling inside the pipe and still have adequate paste strength after high shear rates have been applied. The composition of this invention avoids this problem. However, when the composition of this invention is finally pumped through the holes or nozzles of the drill bit, it is subjected to high shear rates broadly ranging from about 2,000 to 1,000,000 sec.$^{-1}$, preferably 10,000 to 1,000,000 sec.$^{-1}$, which instantly forms a sticky, rubbery paste. The shear strength of this paste, as measured by the laboratory method set forth in the following two paragraphs, will be in excess of at least about 1,000 lbs/100 ft.$^2$, preferably 2,000 lbs/100 ft.$^2$ and still more preferably in excess of 3,000 lbs/100 ft.$^2$. The shear strength of the paste formed from the shear thickening fluid or composition is expressed in pounds per 100 ft.$^2$ as opposed to pounds per ft.$^2$, because 100 ft.$^2$ roughly corresponds to the internal area of a 90 ft. string of drill pipe having an inside diameter of about 4 inches.

In the laboratory, this shear strength may be determined by forming between about 400 to 500 grams of the shear thickening composition and then placing same in a low shear mixing cell for evaluation. This mixing cell is a jacketed glass beaker with internal dimensions of approximately three and one-half inches deep and two and one-half inches wide. The beaker is fitted with a Plexiglass cover through which a hole is drilled to receive the shaft of an egg beater impeller. The egg beater impeller has a diameter of one and a half inches, is two and a quarter inches long and is placed in the beaker so that it just clears the bottom. Sufficient composition is placed in the beaker so that it just covers the top of the impeller. Hot water is circulated through the jacket of the beaker in order to maintain the contents thereof at a temperature of about 120° F. After the shear thickening composition is placed in the warm cell, the egg beater impeller is rotated at a speed of 500 rpm until the composition starts to gel. The point at which the fluid abruptly thickens is defined as the low shear thickening time. This point is quite reproducible and the impeller shaft at this point requires an abrupt increase in input of 90 mv in order to maintain the 500 rpm. In most instances the point of low shear thickening is accompanied by an obvious change in the physical appearance of the dispersion.

After the composition starts to gel, it is then placed in a high shear test cylinder containing a floating piston. The cylinder has a one quarter inch ball valve opening at one end and the other end is pressurized by nitrogen at about 1500 psi. Thus, the sample is placed in the high shear piston cell, the floating piston placed behind the sample, the cell is sealed and then pressurized with nitrogen at about 1500 psi behind the piston. After the chamber is pressurized, the ball valve is opened and the sample is forced through the one quarter inch opening in considerably less than one second which forms a stiff paste substantially instantaneously.

The shear strength of the so-formed paste is measured by noting the distance that a hollow, aluminum cylinder 3.5 inches long $\times$ 1.4 inches wide with a wall thickness of 0.01 inches sinks into the paste under the force of various weights after a period of 20 seconds. The shear strength is then calculated from the following expression:

$$\text{Shear strength, Lb/100 ft.}^2 = 3.6 \times \frac{\text{Total wt., grams}}{\text{Penetration distance, Inches}}$$

It should be noted that the shear strength is expressed in pounds per 100 ft.$^2$ as opposed to pounds per ft.$^2$, because 100 ft.$^2$ roughly corresponds to the internal area of a 90 ft. string of drill pipe having an inside diameter of about 4 inches.

As herein before stated, clays useful in this invention are hydrophilic, water-swellable clays. This includes those clays which are well known to those skilled in the art as useful in well drilling and well control operations. Particularly preferred are montmorillonite and bentonite clays. Species of these clays include beidellite, nontronite, hectorite, and saponite. As a practical matter, cost considerations may dictate that the clays used in this invention will be the sodium montmorillonite or bentonite clays. A commercially available clay that has been found to be useful in this invention are Volclays available from the American Colloid Company. These clays are 90% montmorillonite with about 70–75% of the montmorillonite in the sodium form. Granular clay is preferred to powdered clay. It has been found that the larger the clay particle size used in the shear thickening composition useful in the process of this invention, the longer will be the low shear thickening time and the more clay can be used at a given viscosity. In well control processes, the upper limit of the clay particle size will be limited to that which can pass through the holes in the drill bit. For most applications, it will be preferred to use granular clay having a particle size ranging between about 10 to 200 Tyler mesh and preferably 40 to 200 mesh, although 10–60 mesh clay has also been successfully used in the practice of this invention. If this invention is to be used for well control purposes, then granular clay should be used and preferably granular clay that has had fines removed. Organophilic clays, such as those made by reacting bentonite with one or more long chain hydrocarbon quaternary ammonia compounds, are not included in the scope of this invention.

The continuous, oily phase of the emulsion will be a liquid which is immiscible with water and with the interior aqueous phase of the emulsion. In general, this will comprise any oil or hydrocarbon liquid, typically a mineral oil. Illustrative, but non-limiting examples of oily liquids that have been tried and found to work as the oily phase include paraffinic hydrocarbons such as Low Odor Paraffin Solvent (LOPS) available from the Exxon Chemical Company and Norpar 13 and Solvent 100 Neutral (S-100N) available from Exxon Company, U.S.A., as well as solvents having an appreciable aromatic content such as Mentor 28 and Mentor 32 which are available from the Exxon Company U.S.A. Further, kerosene and diesel fuel will also work, but not as well as the others. That is, the use of kerosene and diesel fuel will result in a reduction of the low shear thickening time and pumpability of the shear thickening fluid and result in a weaker paste. Further, it should be emphasized again that the exact nature of the oil is not critical as long as it is not miscible with the aqueous internal phase of the emulsion and does not react with the clay or any of the other components of the composition.

The continuous, oily, water immiscible phase of the emulsion must contain one or more oil soluble polyamine derivative surfactants for forming and stabilizing the emulsion and to form the film or membrane around each droplet of dispersed aqueous phase. By oil soluble polyamine derivative surfactant is meant an oil soluble compound or polymer comprising a polyamine, preferably an alkylene polyamine, attached to a long chain hydrocarbon polymer or group with or without an intervening bridging group. The long chain hydrocarbon polymer or group imparts oil solubility to the molecule. These surfactants are well known in the art as dispersant additives for automotive crankcase oils. In one case, the polyamine may be attached directly to a long chain hydrocarbon polymer, such as polyisobutylene, directly by reaction of halogenated olefin polymer with polyamine as in U.S. Pat. Nos. 3,275,554; 3,565,592 and 3,565,804. Alternatively, the polyamine may be linked to the long chain hydrocarbon through an acid group such as long chain monocarboxylic acid (U.S. Pat. No. 3,444,170); through a long chain dicarboxylic acid such as polyisobutenyl succinic anhydride (U.S. Pat. Nos. 3,172,892; 3,219,666; and 3,272,746; etc.). Other references to these materials may be found in column 1 of U.S. Pat. No. 4,102,798.

Surfactants that have been found to be particularly useful in the composition of this invention comprise alkylene polyamine derivatives of polyalkenyl succinic anhydrides. These materials are known to those skilled in the art and are taught, for example, in U.S. Pat. No. 3,172,892, the disclosures of which are incorporated herein by reference. Also useful are borated and carboxylated derivatives of these materials such as those disclosed in U.S. Pat. No. 4,173,540 and British Pat. No. 1,018,982, respectively, the disclosures of which are also incorporated herein by reference.

The polyalkenyl succinic anhydrides useful in preparing these surfactants will generally comprise those wherein the polyalkenyl group has a $M_n$, number average molecular weight, of about 700 to 5,000, preferably 900 to 2,000. The methods of preparation are well-known in the art, i.e., reaction of maleic anhydride with either the polyolefin itself or with a chlorinated polyolefin which in either case provides the desired polyalkenyl succinic anhydride. Polyisobutylene is preferred but other polymers of $C_3$ or $C_4$ olefins such as polybutene-1 and polypropylene are suitable, including mixtures of such polyolefins. Polyisobutylene succinic anhydride is referred herein as PIBSA.

Preferred alkylene polyamines are also well-known and are represented by the general formula $NH_2(CH_2)_n[NH(CH_2)_n]_mNH(CH_2)_nNH_2$, wherein n is 2 or 3 and m is 0 to 10. Illustrative are ethylene diamine, diethylene triamine, triethylene tetramine, tetraethylene pentamine, pentaethylene hexamine, tetrapropylene pentamine and the like.

An essential feature of this invention is that the dispersed aqueous phase of the emulsion must contain at least one polycarboxylic acid dissolved therein. Those skilled in the art know that polycarboxylic acids are polymeric acids or polymers containing relatively large numbers of carboxyl groups. Polymeric acids useful in this invention will contain carboxyl groups in an amount sufficient to result in the formation of a film or membrane around each droplet of dispersed aqueous phase in the emulsion.

In one embodiment, the polycarboxylic acid will comprise a copolymer of acrylic acid, methacrylic acid or mixture thereof and an ethyleneically unsaturated monomer copolymerizable therewith. In another embodiment, said polycarboxylic acid may comprise a homopolymer of acrylic acid or methacrylic acid or copolymer thereof.

Polyacrylic acids are carboxylic acids that have been found to be useful in the composition of this invention. Polyacrylic acids include unsubstituted polyacrylic acid made by polymerizing acrylic acid, as well as derivatives thereof such as polymethacrylic acid made by polymerizing methacrylic acid, etc. A wide variety of commercially available polyacrylic acids with molecular weights ranging from about 30,000 to 4,000,000 have been found to work effectively in this invention. Illustrative, but non-limiting examples include Acrysol A-1, A-3 and A-5 from the Rohm & Haas Company as well as Polysciences, Inc.'s Nos. 3326, 3312 and 6501 and Colloids, Inc.'s X-0067-66A, X-0098-Nk-99A and X-0102-Nk-25. An illustrative, but non-limiting example of a suitable polymethacrylic that is commercially available is Polysciences Inc. No. 0578. As a further illustrative, but non-limiting example, a composition of this invention was made employing a copolymer of acrylic acid and acrylamide as the polycarboxylic acid. This composition, prepared and evaluated using the procedure and other components set forth in Example 1, below, exhibited a low shear thickening time of 78 minutes and the resulting paste had a strength of 1100 lb/100 ft.$^2$.

As hereinbefore stated, the aqueous phase of the emulsion must comprise an aqueous solution of both a polyacrylamide polymer and a polycarboxylic acid. Both anionic or partially hydrolyzed polyacrylamide and nonionic or unhydrolyzed polyacrylamide will work in this invention, but, nonionic polyacrylamide is preferred. Polyacrylamides having molecular weights ranging from 100,000 to 6,000,000 have been successfully used in the shear thickening composition of this invention. It has been found that higher molecular weight polyacrylamides impart a more rubbery, elastomeric character to the pastes formed by subjecting the compositions of this invention to relatively high shear. That is, the higher the molecular weight of the water soluble polyacrylamide used in the invention, the greater will be both the shear strength and integrity of the so-formed paste, even in the presence of flowing fluids, such as gas, oil, brine, water, etc. However, the higher the molecular weight of the polyacrylamide used the higher will be the viscosity of the resulting solution. On the other hand, lower molecular weight polyacrylamides give lower viscosities, but require the use of more polycarboxylic acid.

The exact amounts of the various components of this invention will vary somewhat depending upon the nature and molecular weight of the polyamine derivative surfactant, polyacrylamide, polycarboxylic acid, the nature of the oil, etc. The following tables, based on 100 parts by weight of granular clay, illustrate the general and preferred ranges of the various ingredients to each other of the shear thickening composition of this invention.

|  | Parts by Weight | |
|---|---|---|
|  | General | Preferred |
| clay, 40-200 mesh | 100 | 100 |
| water | 25-400 | 100-300 |
| polyacrylamide | 0.1-10 | 0.25-5 |
| oil | 25-130 | 50-100 |
| surfactant | 1-30 | 5-15 |
| polycarboxylic acid | 0.1-10 | 0.25-5 |

A number of different methods may be employed to prepare the composition of this invention, the precise method used being dictated by the convenience of the user. Thus, one may form a dispersion of the clay in the surfactant containing oil. After this dispersion is formed an aqueous solution of polyacrylamide and polycarboxylic acid may be added to the oily dispersion to form a water-in-oil emulsion wherein the aqueous solution is emulsified in the clay-containing continuous oily phase. In this method, one may mix the oil, surfactant and clay in any order without affecting the performance of the composition of this invention before the aqueous solution is emulsified into the oily phase. Alternately, one may form the water-in-oil emulsion in which the aqueous phase is emulsified into the surfactant-containing oil. After the emulsion has been formed, the clay will be dispersed into the continuous oily phase.

If desired, the aqueous phase of the composition of this invention may also contain one or more low molecular weight alcohols or glycols as antifreezes to prevent the aqueous phase of the emulsion from freezing at low temperatures. This may be particularly desirable if one intends to use the composition of this invention in cold weather. Any of the commonly used antifreezes may be employed in the aqueous phase of the composition of this invention such as methanol, isopropanol, ethylene glycol, propylene glycol, etc. When an antifreeze is employed in the aqueous phase of this emulsion, it will generally be employed in said aqueous phase in an amount broadly ranging from about 10 to 35 wt. % thereof.

DESCRIPTION OF A PREFERRED EMBODIMENT

In a typical well plugging application, 116 pounds of American Cyanamide's P-250 polyacrylamide will be dissolved into 16 barrels (about 5,600 lbs.) of fresh water using a turbine blender such as a Halliburton MX 5000B Turbine Type Batch Mixer equipped with two 50 bbl. blending tanks. Next, 290 pounds of a polycarboxylic acid such as Rohm & Haas' Acrysol A-3 polyacrylic acid will be dissolved in 16 barrels (about 5,600 lbs.) of fresh water in a blending tank on a Halliburton HT 400 Pump Truck and then added to the polyacrylamide solution in the turbine mixer. Rohm & Haas' Acrysol A-3 is an aqueous solution containing 25 wt.% polyacrylic acid. In the other 50 bbl. tank of the turbine mixer, a little more than one drum (about 460 lbs) of a PIBSA polyamine derivative surfactant will be dissolved into twelve drums (about 4100 lbs) of oil such as Norpar 13. After the surfactant has been dissolved in the oil, an oil external emulsion or water-in-oil emulsion will then be formed by slowly adding the aqueous polymer solution to the oil while mixing with a marine propeller or the like. The rate of addition of polymer water to the oil will be no greater than about 1 bbl. per minute. After all of the polymer solution has been added to and emulsified in the oil, the resulting emulsion will be circulated several times through a triplex pump to insure complete emulsification.

Immediately prior to use at the well site, about eight barrels of the emulsion prepared above will be set aside for use as front and back spacers for the shear thickening fluid and circulated several times through a Triplex pump to increase its viscosity which should be greater than the viscosity of the drilling mud. The rest of the emulsion will be placed into either a Halliburton ribbon blender or a Halliburton turbine blender. In the blender, 43 sacks (4300 lbs.) of 40-200 Tyler mesh MX-80 Volclay will be dispersed into the continuous oily phase of the emulsion. While the clay is being dispersed into the continuous oily phase of the emulsion, about 20 barrels of water pre-flush will be pumped into the drill pipe in the well bore, the drill pipe containing circulating drilling mud. This pre-flush will be followed by three barrels of the emulsion spacer and then by approximately 46 barrels of the shear thickening fluid formed in the Halliburton ribbon blender. The shear thickening fluid will be pumped down into the drill pipe at a rate of about one barrel per minute using a Halliburton pump truck containing a triplex pump. The shear thickening fluid will be followed with five barrels of emulsion and 20 barrels of water as spacers. Drilling mud will then be used to displace or push the shear thickening fluid through the drill pipe to the zone desired to be plugged in the well bore. The drilling mud will be pumped into the drill pipe at a rate of about three barrels per minute. When the shear thickening fluid reaches the drill bit, the drilling mud will then be pumped into the drill pipe at a rate of about six barrels per minute so that the shear thickening fluid is sheared through the drill bit nozzles at a rate of about six barrels per minute.

The invention will be further understood by reference to the examples below.

EXAMPLE 1

This example demonstrates the low shear thickening time enhancement of the composition of this invention using polyacrylic acid in the dispersed aqueous phase, compared to the same composition without polyacrylic acid in the aqueous phase, the results of which are shown in the FIGURE.

In this experiment, 8 grams of a PIBSA-polyamine derivative surfactant were mixed into 72 grams of Solvent 100 Neutral oil to form the oil phase. After this, 120 grams of 20-40 Tyler mesh KWK clay was added to the surfactant-containing oil, stirring with a spatula, until all the clay was thoroughly coated with oil. This mixture of clay dispersed in the surfactant-containing oil was allowed to stand with occasional stirring for at least five minutes before the aqueous phase was added in order to give the surfactant sufficient time to coat the surface of the clay.

The PIBSA-polyamine derivative surfactant was a borated derivative of the reaction product of polyisobutenyl succinic anhydride and an alkylene polyamine (Dow E-100) which was prepared employing the same procedure and reactants set forth in Example 2 of U.S. Pat. No. 4,173,540, except that the polyisobutenyl succinic anhydride used had a Saponification Number of 112 and a number average molecular weight ($\overline{M}_n$) of about 900.

In making the shear-thickening composition of this invention, 200 grams of an aqueous solution comprising 1 wt.% of American Cyanamid's P-250 polyacrylamide along with 2 wt.% of Rohm & Haas' Acrysol A-3 was slowly poured into the clay containing oil phase and stirred with a spatula at 100-200 rpm to disperse and emulsify the aqueous phase into the clay-containing oil phase to form the shear-thickening composition of this invention. The pH of the aqueous phase was about 3.4. Acrysol A-3 is a 25 wt.% aqueous solution of polyacrylic acid which has a molecular weight of less than 150,000. Another sample of shear thickening composition was made using the same ingredients and procedure used to form the shear-thickening composition of this invention, except that the aqueous phase did not contain any polyacrylic acid.

Each sample of shear thickening composition was then placed in a low shear mixing cell for evaluation of low shear thickening time using the laboratory procedure set forth under Detailed Description, supra.

As previously stated, the results of this experiment are set forth in the accompanying FIGURE and clearly illustrate the low shear thickening time enhancement using the composition of this invention. The actual value of low shear thickening time, as indicated on the FIGURE, was 32 minutes without the polyacrylic acid and 70 minutes with the polyacrylic acid in the aqueous phase.

EXAMPLE 2

This experiment demonstrates the effect of the polyacrylic acid concentration in the aqueous phase of the shear thickening composition and its relation to both low shear thickening time and the strength of the paste formed from the shear-thickening composition.

In this experiment, the shear-thickening composition of this invention was made by dissolving 8 grams of the borated PIBSA-polyamine derivative surfactant, referred to in Example 1, into 72 grams of solvent 100 Neutral oil followed by dispersing the aqueous phase into the oil using a lab type propeller mixer at a speed of 1,000 rpm to form the water-in-oil emulsion, followed by dispersing 120 grams of the clay in the so-formed emulsion using a spatula. The aqueous phase in all cases was 200 grams of an aqueous solution comprising 1 wt.% of the P-250 polyacrylamide. For each shear-thickening composition employed, 80 grams of oil phase and 200 grams of aqueous phase and 120 grams of the KWK clay were use. For three of these shear-thickening compositions prepared, the aqueous phase contained 1, 2 and 3 wt.% Acrysol A-3 polyacrylic acid. As a control, and to provide a valid comparison, one shear-thickening composition was made up identical to the other three but with no polyacrylic acid in the dispersed aqueous phase. The low shear-thickening time and shear strength of the paste formed from the shear-thickening compositions were determined using the laboratory procedure set forth under Detailed Description, infra.

The results are shown in the Table clearly demonstrating that the use of the polyacrylic acid in the aqueous phase results in low shear-thickening time enhancement. It also shows an apparent optimum concentration of this particular polyacrylic acid.

| Wt. % Polyacrylic Acid in Aqueous Phase* | Low Shear Thickening time, min. | Paste Strength Lb/100 ft.$^2$ |
|---|---|---|
| 0 | 32 | 11,800 |
| 0.25 | 49 | 10,200 |
| 0.50 | 70 | 10,400 |
| 0.75 | 71 | 5,100 |

*Dry solids basis.

EXAMPLE 3

This example was an actual field test performed on a well in the continental United States and demonstrates the ability of a shear thickening fluid of this invention to be pumped through more than 10,000 feet of drill pipe and form a high strength plug in the annular space between the drill pipe and well casing after being pumped through the drill bit nozzles. The well contained about 13,000 feet of casing having an I.D. of 8.5 inches with a cement plug at the bottom and about 12,500 feet of drill pipe having a 5 inch O.D. and 4.3 inch I.D. A rotary drill bit having one 11/32 inch and one 14/32 inch nozzle was attached to the bottom of the drill pipe. The bottom hole circulating temperature of the well was 185° F.

A shear-thickening fluid of this invention having the following composition was prepared using the procedure outlined in the DESCRIPTION OF A PREFERRED EMBODIMENT set forth on pages 17 and 18 herein.

| | parts by weight |
|---|---|
| Water | 219 |
| Polymer A | 2.2 |
| Polymer B | 1.4 |
| Oil | 80 |
| Surfactant | 9 |
| Clay | 100 |

Polymer A was American Cyanamid's P-250 polyacrylamide. Polymer B was Rohm and Haas's Acrysol A-3 polyacrylic acid. The oil used was Norpar 13 from Exxon Company U.S.A. The surfactant was the borated PIBSA-polyamine derivative surfactant referred to in Example 1. The clay was a 40-200 Tyler mesh MX-80 clay obtained from the American Colloid Company.

Twenty-two barrels of the emulsion were prepared, fourteen of which were used to prepare the shear thickening fluid with the remaining eight barrels of the emulsion set aside for use as spacers and transferred to a tank on a pump truck. Thirteen sacks (1300 lbs.) of the clay were added to the remaining emulsion in a Halliburton turbine blender to form the 15 barrels of the shear-thickening fluid. After the shear-thickening fluid was prepared, twenty barrels of water were pumped into the drill pipe to insure that the pump lines and drill pipe were not plugged and to clean the lines. The twenty barrel water flush was followed by three barrels of the emulsion spacer, fifteen barrels of the shear thickening fluid, five barrels of emulsion spacer and, finally twenty barrels of water post flush. The viscosity of the emulsion used as spacers had been increased by circulating same through a Triplex pump several times using the procedure set forth in the DESCRIPTION OF A PREFERRED EMBODIMENT. The viscosity of the emulsion spacer was less than that of the shear thickening fluid, but greater than that of the drilling mud. It should be noted that there was drilling mud in the pipe prior to the introduction of the water flush, emulsion spacer and shear-thickening fluid.

The shear-thickening fluid and emulsion spacers were pumped into the drill pipe using a triplex pump. After the water flush, the emulsion spacers and shear-thickening fluid were pumped into the drill pipe at a rate of about 3 barrels per minute. The shear-thickening fluid and spacers were displaced or pushed down through the drill pipe with drilling mud which was pumped at a rate of about 5 barrels per minute. The shear-thickening fluid was pumped out through the drill bit to form the paste and plug the annular space between the drill pipe and well casing. The so-formed plug (paste column) had a strength greater than 1000 lb/100 ft$^2$.

EXAMPLE 4

This experiment demonstrates the efficacy of polymethacrylic acid as the polycarboxylic acid component of the dispersed aqueous phase of the shear-thickening composition of this invention.

In this experiment, a shear-thickening composition of this invention was prepared by dissolving 8 grams of the borated PIBSA-polyamine derivative surfactant, referred to in Example 1, into 72 grams of Solvent 100 Neutral oil followed by dispersing 200 grams of aqueous phase into the oil using a lab type propeller mixer at a speed of 1,000 rpm to form the water-in-oil emulsion. The film or membrane immediately formed around each droplet of dispersed aqueous phase. After the water-in-oil emulsion was formed, 120 grams of the KWK clay was dispersed into the oily phase of the so-formed emulsion using a spatula.

The aqueous phase contained 0.5 wt.% of Polysciences Inc. No. 0578 polymethacrylic acid which has a molecular weight of about 4,200 and 0.5 wt.% of the P-250 polyacrylamide. The pH of this solution was 4.2. This aqueous phase was prepared by dissolving the solid polymethacrylic acid in water in an amount sufficient to form a 1 wt.% solution of polymethacrylic acid. One hundred grams of this polymethacrylic acid solution were mixed with 100 grams of an aqueous solution of 1 wt.% of the P-250 polyacrylamide to form the aqueous phase.

The low shear-thickening time and the shear strength of the paste form from this composition were also determined using the laboratory procedure set forth under the Detailed Description, infra and were found to be 50 minutes and 7,400 lb/100 ft.$^2$, respectively.

What is claimed is:

1. A composition of matter comprising a water-in-oil emulsion particles of hydratable, hydrophilic clay dispersed in the continuous oily phase thereof wherein an oil soluble surfactant comprising a polyamine attached to a long chain hydrocarbon with or without an intervening bridging group is dissolved in said oily phase, wherein said aqueous phase comprises an aqueous solution, having a pH of less than 7, of both a polycarboxylic acid and a polyacrylamide and wherein each droplet of dispersed aqueous phase of the emulsion is encapsulated by a film at the interface of the aqueous and oily phases.

2. The composition of claim 1 wherein said film results from the interaction of said surfactant, polycarboxylic acid and polyacrylamide.

3. The composition of claim 1 wherein said clay is granular.

4. The composition of claim 3 wherein said composition comprises, on a parts by weight basis, about 100 parts of clay, from about 25 to 400 parts of water, from about 0.1 to 10 parts of polyacrylamide, from about 25 to 130 parts of oil, from about 1 to 30 parts of surfactant and from about 0.1 to 10 parts of carboxylic acid.

5. The composition of claim 4 wherein said clay comprises a bentonite clay.

6. The composition of claim 5 wherein said polyamine portion of said surfactant molecule comprises an alkylene polyamine.

7. The composition of claim 6 wherein the particle sie of said granular clay ranges between about 40-200 Tyler mesh.

8. The composition of claim 7 wherein said surfactant is an alkylene polyamine derivative of PIBSA.

9. The composition of claim 8 wherein said composition comprises, on a parts by weight basis, about 100 parts of clay, from about 100-300 parts of water, from about 0.25-5 parts of polyacrylamide from about 50-100 parts of oil, from about 5-15 parts of surfactant and from about 0.25-5 parts of polycarboxylic acid.

10. The composition of either of claims 7, 8 or 9 wherein said polycarboxylic acid comprises a copolymer of acrylic acid, methacrylic acid or mixture thereof and an ethyleneically unsaturated monomer polymerizable therewith.

11. The composition of either of claims 7, 8 or 9 wherein said polycarboxylic acid comprises homopolymer of acrylic acid or methacrylic acid or copolymer thereof.

12. A shear thickening composition of matter comprising a water-in-oil emulsion having particles of granular, hydratable, hydrophilic clay dispersed in the continuous oily phase thereof wherein said oily phase comprises a hydrocarbon liquid having an oil soluble surfactant which comprises a polyamine attached to an oil solubilizing hydrocarbon with or without an intervening bridging group dissolved therein and wherein said dispersed aqueous phases comprises an acid aqueous solution, having a pH of less than 7, of both a polycarboxylic acid and a polyacrylamide and wherein each droplet of dispersed aqueous phase of the emulsion is encapsulated by a film at the interface of the aqueous and oily phases.

13. The composition of claim 12 wherein said film results from the interaction of said surfactant, polycarboxylic acid and polyacrylamide.

14. The composition of claim 13 wherein said polyamine portion of said surfactant molecule comprises an alkylene polyamine.

15. The composition of claim 14 wherein said composition comprises, on a parts by weight basis, about 100 parts of clay, from about 25 to 400 parts of water, from about 0.1 to 10 parts of polyacrylamide, from about 25 to 130 parts of oil, from about 1 to 30 parts of surfactant and from about 0.1 to 10 parts of carboxylic acid.

16. The composition of claim 15 wherein said surfactant is an alkylene polyamine derivative of PIBSA.

17. The composition of claim 16 wherein the particle size of said granular clay ranges from between about 40-200.

18. The composition of claim 17 wherein said composition comprises, on a parts by weight basis, about 100 parts of clay, from about 100-300 parts of water, from about 0.25-5 parts of polyacrylamide, from about 50-100 parts of oil, from about 5-15 parts of surfactant and from about 0.25-5 parts of polycarboxylic acid.

19. The composition of either of claims 18, 16, 17 or 18 wherein said polycarboxylic acid comprises a copolymer of acrylic acid, methacrylic acid or mixture thereof and an ethyleneically unsaturated monomer polymerizable therewith.

20. The composition of either of claims 18, 16, 17 or 18 wherein said polycarboxylic acid comprises homopolymer of acrylic acid or methacrylic acid or copolymer thereof.

21. A composition of matter comprising a water-in-oil emulsion wherein an oil soluble surfactant which comprises a polyamine attached to a long chain hydrocarbon group with or without an intervening bridging group is dissolved in said oily phase, wherein said aqueous phase comprises an aqueous solution, having a pH below 7, of both a polycarboxylic acid and a polyacrylamide and wherein each droplet of dispersed aqueous phase of the emulsion is encapsulated by a film at the interface of the aqueous and oily phases.

22. The composition of claim 21 wherein said film results from the interaction of said surfactant, polycarboxylic acid and polyacrylamide.

23. The composition of claim 22 wherein said polyamine portion of said surfactant molecule comprises an alkylene polyamine.

24. The composition of claim 23 wherein said polycarboxylic acid comprises a copolymer of acrylic acid, methacrylic acid or mixture thereof and an ethyleneically unsaturated monomer polymerizable therewith.

25. The composition of claim 24 wherein said composition comprises, on a parts by weight basis, from about 25 to 400 parts of water, from about 0.1 to 10 parts of polyacrylamide, from about 25 to 130 parts of oil, from about 1 to 30 parts of surfactant and from about 0.1 to 10 parts of polycarboxylic acid.

* * * * *